(12) United States Patent
Harris et al.

(10) Patent No.: US 7,522,548 B2
(45) Date of Patent: Apr. 21, 2009

(54) PROVIDING PRESENCE INFORMATION IN A COMMUNICATION NETWORK

(75) Inventors: John M. Harris, Chicago, IL (US);
Ronald T. Crocker, St.Charles, IL (US);
Thomas B. Hart, West Dundee, IL (US);
Valentin Oprescu-Surcobe, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 362 days.

(21) Appl. No.: 11/007,567

(22) Filed: Dec. 8, 2004

(65) Prior Publication Data
US 2006/0119882 A1    Jun. 8, 2006

(51) Int. Cl.
H04H 20/71    (2008.01)
H04J 3/16    (2006.01)
H04L 12/58    (2006.01)
H04B 7/00    (2006.01)

(52) U.S. Cl. ............... 370/312; 370/471; 455/412.2; 455/519

(58) Field of Classification Search .......... 455/466, 455/412.2, 435.1, 456.1; 370/312, 395.1, 370/471
See application file for complete search history.

(56) References Cited

U.S. PATENT DOCUMENTS

| 6,035,203 | A | 3/2000 | Hanson | |
|---|---|---|---|---|
| 6,343,320 | B1* | 1/2002 | Fairchild et al. | 709/224 |
| 2002/0091824 | A1 | 7/2002 | Anderson et al. | |
| 2004/0088348 | A1* | 5/2004 | Yeager et al. | 709/202 |
| 2005/0044143 | A1* | 2/2005 | Zimmermann et al. | 709/204 |

* cited by examiner

*Primary Examiner*—Nick Corsaro
*Assistant Examiner*—Shannon R Brooks

(57) ABSTRACT

A server (101) designates and assigns each of a plurality of communication devices to at least one of a plurality of groups. The server (101) prepares a communication having presence information corresponding to a status of the communication devices in the group; determines network infrastructure device(s) serving the group; and transmits, at a pre-determined time, the communication to the network infrastructure device(s). A network infrastructure device (103a-c, 105a-f) receives the communication and transmits, as a common channel signal during the pre-determined time, a signal with the presence information. A communication unit (107a, 107b, 107c) receives an indication of the pre-determined time; transmits, at an interval proximate to the pre-determined time, a signal indicating the communication device's status; and receives, at the pre-determined time, the signal with the presence information.

6 Claims, 6 Drawing Sheets

PROVIDING PRESENCE INFORMATION IN A COMMUNICATION NETWORK

FIELD OF THE INVENTION

The present invention relates in general to wireless communication units and wireless networks, and more specifically to providing presence information to one or more wireless communication units.

BACKGROUND OF THE INVENTION

In its simplest form, presence information is information provided regarding a status of another communication device's availability, capability, and/or another user's desire to communicate. Presence information that can be provided can answer questions such as: Is your contact's mobile telephone powered on? Is your contact in a call? Is your contact in an area serviced by the communication network where she can receive calls? Does your contact's telephone have direct connect capabilities? Does your contact prefer a text message?

Presence information can be detected by the communication network, and/or can be provided by the communication device to the network. Presence information can be collected from applications running on the communication device, from the communication device itself, and/or from queries to the communication network. The communication network can provide presence information about the communication device, for example, whether the communication device is in a coverage zone, whether the communication device is turned on, whether the communication device is on a call, and/or the location of the communication device.

The presence information can be aggregated by a presence server and provided to select groups of people in a user's list of entities for which it subscribes to obtain updated presence information, commonly referred to as a "buddy list," and/or in other applications utilizing presence information. The presence server can check the user's buddy list and provide the user with information about the status of those entities. In addition, the presence server can update presence information in the buddy lists of the user's buddies to indicate the user's current status.

The problem of obtaining updated presence information from communication devices and then distributing the presence information is multifold. A conventional alternative suggests that a communication device can initiate a data call periodically (e.g., every 5 minutes), submit its current presence information to the communication network, and receive presence information for other entities which the communication device includes in one or more so-called buddy lists. This can be expensive, typically for the subscriber who is consuming valuable air time for transmitting status information. Moreover, the status information that is thereafter distributed to other communication devices upon making similar requests can quickly become stale.

BRIEF DESCRIPTION OF THE DRAWINGS

The accompanying figures, where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Figure 1:
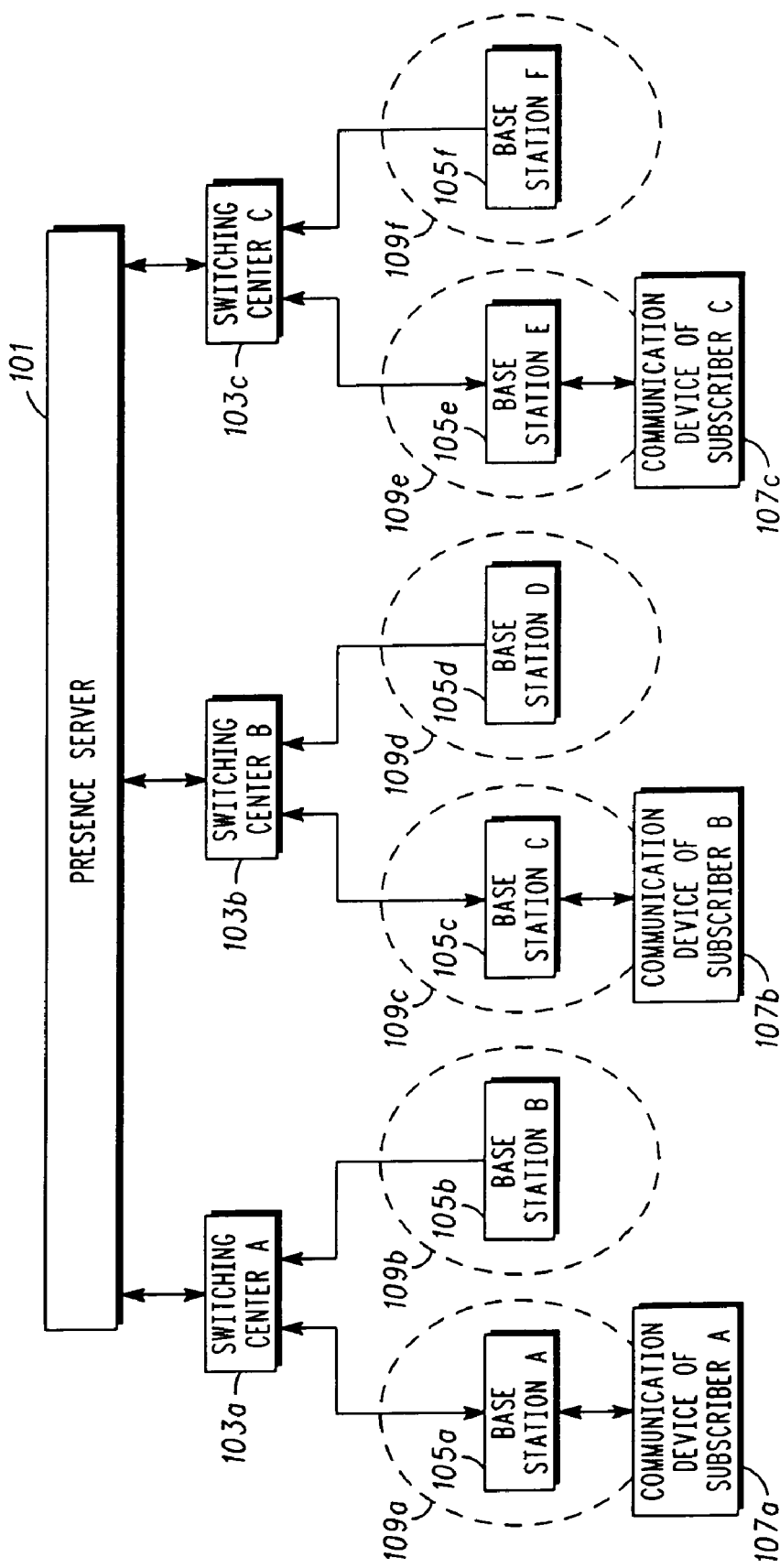
FIG. 1 is a diagram illustrating a simplified and representative environment associated with one or more communication units and an exemplary wireless network for providing presence information in accordance with various exemplary embodiments.

In overview, the present disclosure concerns wireless communication devices or units, often referred to as communication units, such as cellular phone or two-way radios and the like having an operating capability to provide a status of other subscribers on the network, and the supporting network infrastructure devices associated with a communication system such as an Enterprise Network, a cellular Radio Access Network, or the like. Such communication systems may further provide services such as voice and data communications services. More particularly, various inventive concepts and principles are embodied in systems, communication units, and methods therein for providing presence information associated with entity lists to communication units on the communication system.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as one or more processors and software therefore or application specific ICs. Where appropriate, the processor can be, for example, a general purpose computer, can be a specially programmed special purpose computer, can include a distributed computer system, and/or can include embedded systems. Similarly, where appropriate, the processing could be controlled by software instructions on one or more computer systems or processors, or could be partially or wholly implemented in hardware. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by various exemplary embodiments.

As further discussed herein below, various inventive principles and combinations thereof are advantageously employed to increase the freshness of presence information provided by the communication network to a communication device, and to reduce potentially redundant exchanges of presence information between the communication network and the communication device.

The term entity is used herein to broadly refer to a subscriber unit, a communication unit or units, or other device that, in accordance with one or more embodiments, can be ordinarily associated with a particular subscriber or other person, even if such person is unknown.

An entity list is utilized to refer to a list of entities, for example, a list of subscribers, where the list corresponds to a particular user, thereby providing the user with a list of, e.g., preferred contacts and optionally associated information. An entity list can comprise what is sometimes referred to as a "buddy list." In accordance with one or more embodiments, a particular user can have one or more entity lists.

The term presence information is utilized herein to broadly refer to information that can be collected by the network reflecting a status of a communication unit or units corresponding to a particular user, in relation to a communication network of interest. Typically, the presence information is presented by the entity to the communication network, and/or detected by the communication network. The presence information can include, by way of example, "on", "off", "busy", "idle", "available" and/or a location of the subscriber device. Presence information can be collected on a variety of devices, including those that lack data capability as well as more sophisticated devices.

Further in accordance with exemplary embodiments, distribution of the collected presence information is provided in an efficient manner by broadcasting presence information that is of interest to relevant groups of communication devices. If desired, the broadcast can be limited to specific network infrastructure devices where the members of the groups are currently located. Moreover, a freshness of the presence information can be provided by collecting the presence information immediately prior to the distribution of the presence information.

FIG. 1 provides an overview of a representative communication network, utilized for discussing various embodiments. Referring to FIG. 1, a diagram illustrating a simplified and representative environment associated with one or more communication units and an exemplary wireless network for providing presence information in accordance with various exemplary embodiments will be discussed and described. The wireless network includes one or more presence servers 101, and one or more network infrastructure devices, here represented by switching centers A-C 103a-103c, and base stations A-F 105a-105f. In the example communication network, the presence server 101 communicates with the switching centers A-C 103a-103c, and the switching centers A-C 103a-103c communicate with base stations A-F 105a-105f. Additional elements can be included in a communication network, as will be known to those practicing in this field, although they are omitted from this simplified example of a communication network for clarity of discussion.

Communications between the communication devices and the communication network are provided to/from network infrastructure devices. In the present example, a base station, e.g., base station A 105a communicates with a communication unit, e.g., communication device of subscriber A 107a, which is within range, represented here by a first page area 109a. The other base stations, e.g., base stations B-F 105b-105f have respective ranges, represented in this example by page areas 109b-109f, and can communicate with communication units which are within range, e.g., a communication device of subscriber B 107b and a communication device of subscriber C 107c.

The presence server 101 can access presence information which has been previously collected and is stored, for example, as provided for in current conventional techniques. For example, presence information can be provided by a visitor location register ("VLR"). The VLR may be included or cached in a soft switch or a dispatch user database that is included or cached in the presence server 101, and/or an infrastructure device of a communication network and accessible to the presence server 101. The VLR can maintain information reflecting presence information such as whether the user is busy. Current conventions provide that the VLR can include presence information provided by the subscriber unit itself, detected by the communication network, and can include status information of users registered on the communication network. In summary, current procedures generally provide for collecting presence information from communication devices and storing the presence information in a way that can be accessed by the presence server 101, although these current procedures can be improved by various embodiments, examples of which are discussed herein. Accordingly, the presence server 101 can retrieve the presence information for the communication from a storage medium.

The presence server 101 can prepare one or more communications to provide the presence information. For example, the presence information corresponding to various communication devices that are to be included in a communication can be retrieved from storage. The presence information can then be included or indicated in the communication(s).

Additionally, the communication can include or otherwise be associated with routing information so that the communication can be routed from the presence server 101 to selected ones of the network infrastructure devices, e.g., a portion of switching centers A-C 103a-103c and base stations A-F 105a-105f, so as to reach communication devices to which the presence information is of interest, e.g., communication devices of subscribers A-C 107a-107c.

As is explained in further detail below, entities listed in various entity lists can be grouped together. Entity lists tend to cross-list some or many of the same entities. For example, entity lists of various co-workers tend to be quite similar, as they list most of the same co-workers. The same tends to be true for entity lists of friends, family or other social groups. Hence, presence information for entities can be grouped and a communication with the presence information can be targeted to corresponding communication devices, where the presence information in the communication spans the various related entity lists.

Further, it is somewhat likely that at least a portion of the entities that have been grouped will be in a similar geographic location. Accordingly, the communication that is ultimately provided to the communication devices optionally can be provided as a group communication and/or a broadcast communication. The communication optionally can include a distribution address so that it can be distributed to selected ones of the network infrastructure devices.

In accordance with one or more embodiments, presence information can conveniently be represented by a bitmap indicating the presence information for multiple communication devices. It can be advantageous for the presence server 101 to preliminarily transmit a communication to the communication devices indicating the correspondence between locations in the bitmap and the corresponding entities. Similarly, the communication devices can be programmed to determine the correspondence between indications in the bitmap, the entities, and presence information represented therein.

The communication with the presence information can be directed via the network infrastructure devices, here represented by the switching centers A-C 103a-103c and the base stations A-F 105a-105f. It will be understood that the functions performed by a switching center and base stations can, in various embodiments, be combined in a network infrastructure device. The switching centers A-C 103a-103c can receive the communication with the presence information, can determine where the communication devices targeted by the communication are currently registered, and can determine which base stations are within range of appropriate communication devices. In the present example, the switching centers A-C 103a-103c can determine that the base stations in range are base stations A, C and E 105a, 105c, 105e. The switching centers A-C 103a-103c can forward the communication with the presence information to the base stations A, C and E 105a, 105c, 105e that are in range. Alternative embodiments provide that the communication additionally can be transmitted from an adjacent network infrastructure device, e.g., an adjacent base station. Conveniently, a channel exclusively designated to carry signaling information, such as a forward common signaling channel, may be utilized for forwarding the communication.

The base stations A, C and E 105a, 105c, 105e can transmit the communication with the presence information to the communication devices of subscribers A, B and C 107a, 107b, 107c. As explained above, it may be advantageous for the communication to be broadcast or to be a group communication for the group to which the subscribers A, B and C belong.

In accordance with various embodiments, the communication can be transmitted from the network infrastructure devices to the communication devices at a particular pre-determined time. Thereby, the communication devices can wake up at the appropriate time, in order to receive the communication with the presence information. The communication devices have been previously informed by the network infrastructure device of the pre-determined time when the communication with the presence information will be transmitted, and any other information useful for receiving and/or interpreting the communication. For example, a base station can send a message with the pre-determined time, a broadcast address to listen to, and a definition of the information to be provided in the communication (e.g., a mapping of the bitmap to entities).

As will be appreciated from the foregoing, the number of communications that need to be provided by the communication network to communication devices in order to provide presence information can be reduced.

In addition, one or more embodiments can provide that the presence information provided in the communication is relatively fresh. Accordingly, the communication devices, e.g., the communication devices of subscribers A, B and C 107a, b, c can be programmed to submit their respective presence information to the communication network proximate to the pre-determined time, just before the communication with the presence information is provided. The presence information that is submitted by the communication devices is collected by the communication network in accordance with conventional techniques, and stored for later retrieval. Accordingly, when the presence server 101 accesses the stored presence information in order to provide the communication with the presence information, the data present in the stored presence information is relatively fresh. The freshness of the data is explained in more detail below in connection with FIG. 5 and FIG. 6. The communication devices can be instructed to submit presence information at a specified time, advantageously a very short time, preceding the pre-determined time. Accordingly, the presence information that is included for distribution in the communication to other communication devices can be quite fresh.

Figure 2:
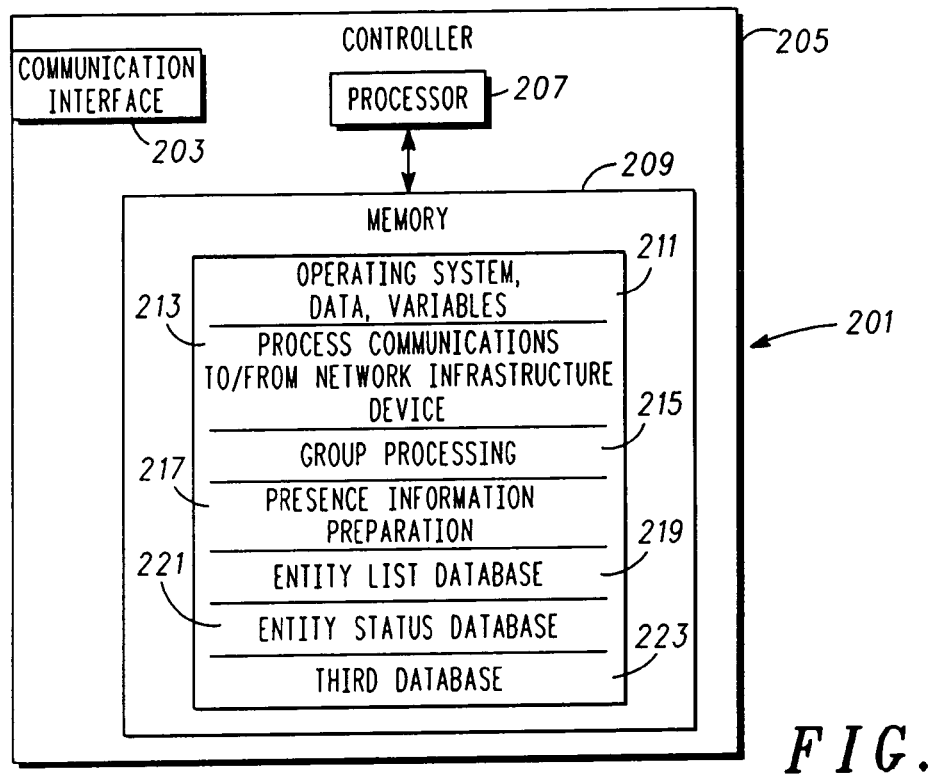
FIG. 2 is a diagram illustrating portions of an exemplary presence server arranged for use in updating presence information in accordance with various exemplary embodiments.
Figure 3:
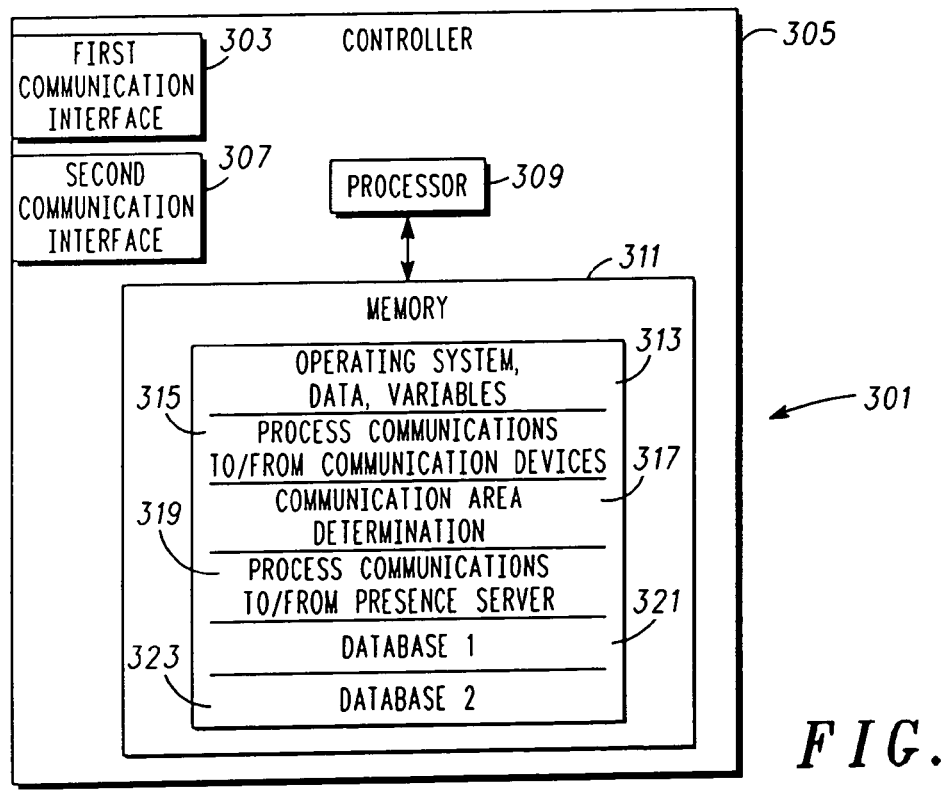
FIG. 3 is a block diagram illustrating portions of an exemplary infrastructure device for use in connection with distributing presence information in accordance with various exemplary embodiments.
Figure 4:
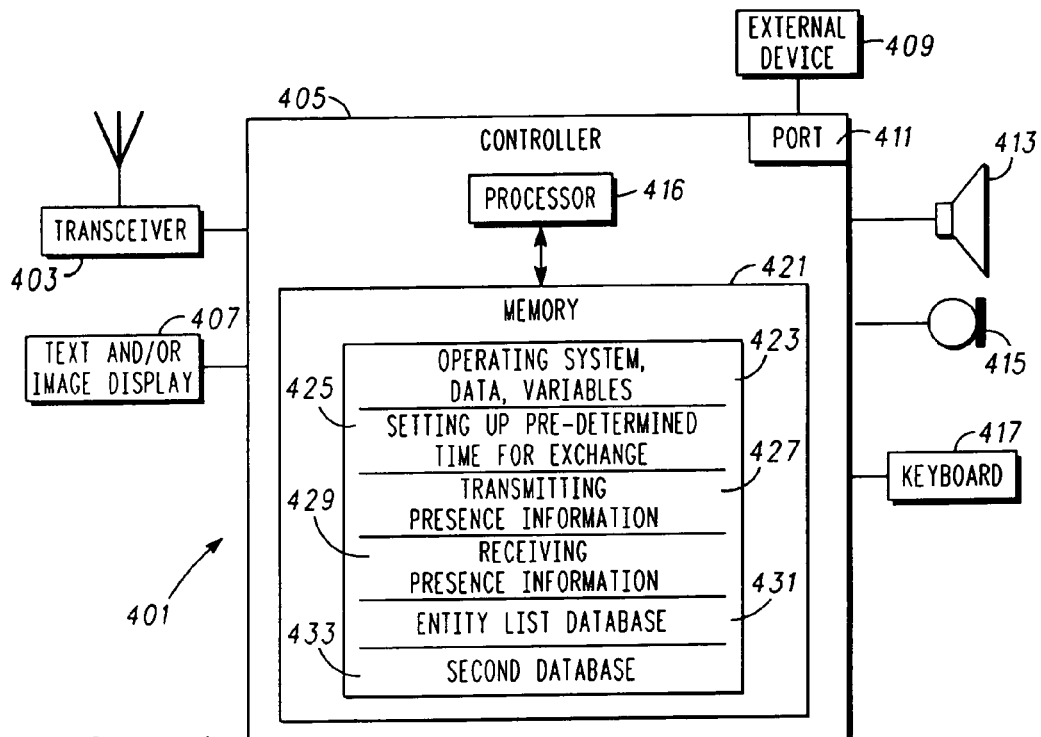
FIG. 4 is a block diagram illustrating portions of an exemplary communication device arranged for use in connection with submitting presence information in accordance with various exemplary embodiments.

FIG. 2, FIG. 3, and FIG. 4 illustrate portions of an exemplary presence server, an exemplary network infrastructure device, and an exemplary communication device, respectively, for use in connection with one or more embodiments. The following description provides, by way of example, additional details alluded to by the foregoing discussion.

Referring now to FIG. 2, a diagram illustrating portions of an exemplary presence server arranged for use in updating presence information in accordance with various exemplary embodiments will be discussed and described. The server 201 may include one or more controllers 205, and a communication interface 203. The controller 205 as depicted generally comprises a processor 207, a memory 209, and may include various other functionality that is not relevant but will be appreciated by those of ordinary skill.

The processor 207 may comprise one or more microprocessors and/or one or more digital signal processors. The memory 209 may be coupled to the processor 207 and may comprise one or more of a read-only memory (ROM), a random-access memory (RAM), a programmable ROM (PROM), an electrically erasable read-only memory (EEPROM) and/or magnetic or optical memory or the like. The memory 209 may include multiple memory locations for storing, among others, an operating system, data and variables 211 for programs executed by the processor 207; computer programs for causing the processor to operate in connection with various functions such as processing communications to/from the network infrastructure devices 213, processing groups 215, preparing presence information 217, and/or other processing (not illustrated); a database 219 of entity lists; a database of entity status 221; and a third database 223 for other information used by the processor 207.

The computer programs may be stored, for example, in ROM, PROM, etc. and can direct the processor 207 in controlling the operation of the controller 205.

The processor 207 can be programmed for processing communications to and/or from the network infrastructure devices 213. Also, the processor 207 can be programmed for processing groups 215. For example, one or more embodiments provides that the processor 207 can designate, for communication devices, one or more groups, and assign each of the communication devices to one or more of the groups. A more detailed description of exemplary group assignment is provided below.

The processor 207 can be programmed for preparing presence information 217 for transmission to the communication devices, described above for example. One or more embodiments provide that the processor 207 can prepare the communication having the presence information corresponding to a status of the communication devices in the one or more groups.

The processor 207 can be programmed to determine one or more network infrastructure devices serving the group or groups. For example, the processor 207 can access information that is conventionally stored to provide information on the network infrastructure device serving respective communication devices for entities in each of the groups.

The processor 207 can transmit, in accordance with the communication interface 203, the communication to network infrastructure devices including the one or more network infrastructure devices previously determined. Responsive to signaling received from the communication interface 203, or in accordance with instructions stored in memory 209, the processor 207 may handle communications, for example, communications to/from the network infrastructure devices. The processor 207 may be programmed, for example, to transmit the communication over the communication interface 203.

In accordance with one or more embodiments, the processor 207 can include, in the communication, a unique identifier corresponding to each of the communication devices in the group. For example, the communication optionally can include a mobile directory number (MDN) for the communication devices in the group, and/or a group identifier. The unique identifier can be utilized by network infrastructure devices downstream to further target the communication to the specified communication devices.

Referring now to FIG. 3, a block diagram illustrating portions of an exemplary infrastructure device for use in connection with distributing presence information in accordance with various exemplary embodiments will be discussed and described. FIG. 3 illustrates an exemplary network infrastructure device 301 in an exemplary communication network, e.g., a soft switch or a base station, in accordance with various exemplary embodiments. It will be appreciated that the functions illustrated as being provided in the instant network infrastructure device could be distributed amongst multiple network infrastructure devices, e.g., a soft switch in combination with a base station. The network infrastructure device 301 may include one or more controllers 305, a first communication port 303 for communicating with other network infrastructure devices or the presence server, and a second communication port 307 for communicating with communication devices. The controller 305 as depicted generally comprises a processor 309, a memory 311, and may include various other functionality that is not relevant but will be appreciated by those of ordinary skill.

The processor 309 may comprise one or more microprocessors and/or one or more digital signal processors. The memory 311 may be coupled to the processor 309 and may comprise one or more of a read-only memory (ROM), a random-access memory (RAM), a programmable ROM (PROM), an electrically erasable read-only memory (EEPROM) and/or magnetic or optical memory or the like. The memory 311 may include multiple memory locations for storing, among others, an operating system, data and variables 313 for programs executed by the processor 309; computer programs for causing the processor to operate in connection with various functions such as processing communications to/from communication devices 315, determining communication areas 317, processing communication to/from one or more presence servers 319, and/or other processing; a database 321 of various parameters utilizing in determining communication areas; and a database 323 for other information used by the processor 309. The computer programs may be stored, for example, in ROM, PROM, etc. and can direct the processor 309 in controlling the operation of the controller.

Responsive to signaling received from the first communication port 325, the second communication port 327, or in accordance with instructions stored in memory 311, the processor 309 may handle communications, for example, a communication to provide presence information to communication devices, a communication from the communication device to submit the communication devices presence information, and/or communications from the presence server to inform the communication device of the pre-determined time for exchanging presence information.

The processor 309 can be programmed to provide functions including determining communication areas 317. For example, the communication may include information specifying the communication area, or information indicating the communication devices, whereby the processor 309 can access the second database 323 to obtain information on where the indicated communication devices are located. In accordance with various embodiments providing multiple network infrastructure devices between the presence server and the communication device, such as where there is provided a switching center and a base station, the respective network infrastructure devices can each determine the communication area of the communication device and transmit the communication to the appropriate communication area, e.g., the appropriate downstream base station.

The processor 309 can additionally be programmed to provide a function including processing communications to/from one or more presence servers 319. For example, the processor 309 can receive one or more communications, e.g., from the presence server, with presence information corresponding to a status of multiple communication devices. Examples of information included in such a communication have been previously detailed.

Further, the processor 309 may be programmed to provide functions including, for example, transmitting and receiving communications from a first communication interface 303 over a first communication network, e.g., to communicate with a communication device 315. For example, the processor can transmit, in accordance with the first communication interface 303 during a pre-determined time, one signal with the presence information to the communication devices corresponding to the communication area. Advantageously, the communication can be transmitted as a common channel signal. Furthermore, one or more embodiments provide that the presence information can be transmitted in one signal from the network infrastructure device to the communication device, e.g., as a group message, broadcast message, or multicast message, e.g., to any communication device listening to the proper transmitter at the appointed time.

One or more embodiments provides that the processor 309 transmits a communication to the communication devices, where the communication includes the pre-determined time, and optionally other information useful for receiving and/or interpreting the communication. Accordingly the processor 309 can be programmed to facilitate transmitting, in accordance with the first communication interface 303, a signal to the communication devices corresponding to the communication area (e.g., as determined above), with information indicating at least the pre-determined time. Optionally, the processor 309 can be programmed to facilitate transmitting, in accordance with the first communication interface 303, a signal with information indicating a pre-determined common channel for receiving the previous signal, i.e., the signal with the presence information.

In accordance with one or more embodiments, the communication, e.g., from the presence server, can include a unique identifier corresponding to the communication devices, such as are in the group.

As another example, the processor can receive, in accordance with the first communication interface 303 at an interval proximate to the pre-determined time, one or more signals from the communication devices having updated presence information corresponding to the each communication device. As previously stated, the communication devices can submit their respective presence information to the communication network proximate to the pre-determined time, just before the signal with the presence information is provided by the network infrastructure device.

Advantageously, the proximate time can allow sufficient time for the updated presence information to be provided in due course to the usual storage information, so as to be retrieved by the presence server and included in the communication from the presence server that ultimately is the next communication providing updated presence information to the communication device. Accordingly, the updated presence information corresponding to the communication device is included with the presence information in the first signal, i.e., the signal providing the updated presence information to the communicate device.

One or more embodiments provide that the presence information that is provided to the communication device is in the form of a bitmap. Accordingly, it may be desirable to provide the communication devices with information so that the bitmap can be decoded, e.g., it can be determined which bits correspond to which entities, and which data corresponds to which particular presence information. Therefore, the processor 309 can be programmed to transmit, in accordance with the first communication interface 303, a signal with information indicating the communication devices corresponding to the presence information in the first signal, i.e., the signal with the presence information. This signal can be provided before and/or after the presence information is provided.

Referring to FIG. 4, a block diagram illustrating portions of an exemplary communication device arranged for use in connection with submitting presence information in accordance with various exemplary embodiments will be discussed and described. The communication device 401 may include a controller 405, a transceiver 403, and a communication port 411 for communication with an external device 409. The controller as depicted generally includes a processor 416, and a memory 421, and may include other functionality not illustrated for the sake of simplicity. The communication unit may further include, e.g., a speaker 413, a microphone 415, a text and/or image display 407, an alerting device (not illustrated) for providing vibratory alert, visual alert, or other alert, and/or a user input device such as a keypad 417.

The processor 416 may comprise one or more microprocessors and/or one or more digital signal processors. The memory 421 may be coupled to the processor 416 and may comprise for example one or more of a read-only memory (ROM), a random-access memory (RAM), a programmable ROM (PROM), and/or an electrically erasable read-only memory (EEPROM). The memory 421 may include multiple memory locations for storing, among others, an operating system, data and variables 423 for programs executed by the processor 416; computer programs for causing the processor to operate in connection with various functions such as setting up pre-determined times for exchange of presence information 425, transmitting presence information 427, receiving presence information 429, and/or other processing (not illustrated); a database 431 of various entity lists; and a database 433 for other information used by the processor 416. The computer programs may be stored, for example, in ROM, PROM, etc. and may direct the processor 416 in controlling the operation of the communication device 401.

The processor 416 may be programmed to set up one or more pre-determined times for exchange of presence information 425. For example, the communication network can transmit an indication of a pre-determined time, which is received via the transceiver 403. Accordingly, the processor 416 can be programmed for receiving, from a connection initiated by the communication network, an indication of the pre-determined time for exchanging presence information.

Further, the processor 416 may be programmed to transmit presence information 427. The presence information including the current status of the communication unit should be submitted just prior to the pre-determined time. The processor 416 can be programmed to transmit, at an interval proximate to the pre-determined time, and in accordance with the transceiver 403, one (or more) signals having presence information indicative of a status of the communication unit.

Optionally, where the current status of the communication unit has not changed from the status that was previously submitted to the communication network, the processor 416 can skip sending the updated presence information. In accordance with one or more embodiments, the processor 416 can be programmed to determine whether the status has changed, so that the transmitting is performed (at the appropriate time) responsive to a change in status.

Moreover, the processor 416 may be programmed to receive presence information 429. The presence information that is received should correspond to entities in the communication device's entity list. The processor 416 therefore can be programmed to receive, in accordance with the transceiver 403, a transmission initiated by the communication network at the pre-determined time, having presence information corresponding to at least one other communication unit. Because the presence information can be provided to multiple communication units, the presence information received in the transmission further includes presence information corresponding to the communication unit. Optionally, the presence information received in the transmission is in the form of a bitmap.

Advantageously, the communications discussed above can be transmitted on a channel designated for signals, e.g., a common channel signal. It can be advantageous to program the processor 416 so that one or more of the communications discussed above between the communication device and the network infrastructure device, e.g., the base station, are in accordance with a common channel signal.

The display 407 may present information to the user by way of a conventional liquid crystal display (LCD) or other visual display, and/or by way of a conventional audible device (e.g., the speaker 413) for playing audible messages. The user may invoke functions accessible through the user input device 417. The user input device 417 may comprise one or more of various known input devices, such as a keypad as illustrated, a computer mouse, a touch pad, a touch screen, a trackball, and/or a keyboard. Responsive to signaling from the user input device 417, or in accordance with instructions stored in memory 421, the processor 416 may direct or manage stored information or received information. For example, in response to receipt of updated presence information, the processor 416 can update the display 407 to indicate the presence information for one or more entities. As another example, the processor 416 can be programmed or otherwise configured to, e.g., interact with the user, in order to determine one or more entities to be included on a particular entity list. Moreover, when one or more entity lists are determined, the processor 416 can transmit one or more entity lists over the transceiver 403; similarly, when one or more entities are changed in an entity list, the processor 416 can transmit the modified entity list.

The following section provides an exemplary discussion relating to the creation of groups. One or more embodiments provides for the assigning of communication devices (or entities) to groups, where there are a few groups and each group is well populated. The mechanics of assigning communication devices to one or more groups is unimportant, and can utilize any of various group theory mechanisms. Nevertheless, the following discussion is employed to provide a better understanding of groups in one or more embodiments.

Consider where there are ten entities, and each of the ten entities has its own, different, entity list. The following table summarizes the entities included in each communication device's entity list, where the left column represents the user number that owns the entity list, and the row to the right indicates the entities included in the user's entity lists:

| USER# | \multicolumn{10}{c}{USERS INCLUDED IN THE ENTITY LIST} |
|---|---|---|---|---|---|---|---|---|---|---|
|  | 1 | 2 | 3 | 4 | 5 | 6 | 7 | 8 | 9 | 10 |
| 1 |   | X | X |   | X |   | X |   |   |   |
| 2 |   |   | X | X | X |   |   |   |   |   |
| 3 | X | X |   | X | X |   |   |   |   |   |
| 4 |   | X |   |   | X |   |   | X |   |   |
| 5 |   | X | X |   |   |   |   |   |   |   |
| 6 |   |   |   |   |   |   | X |   | X | X |
| 7 |   |   |   |   |   | X |   | X | X | X |
| 8 |   | X |   |   |   |   |   | X | X | X |
| 9 |   |   |   |   |   |   | X |   |   | X |
| 10 |   |   |   |   |   | X |   | X | X |   |

Two groups can be created out of the foregoing, a first group covering user numbers 1-5 and a second group covering user numbers 6-10. Some of the users list entities in their entity lists which span another group, e.g., user 1 lists user 7, user 4 lists user 8, and user 8 lists user 2. The communication devices of users that do not span groups, i.e., that correspond to a single group, can monitor their respective individual groups and obtain updated presence information in a single communication.

One or more embodiments provide that the communication devices of users that span two or more groups can monitor the groups and obtain updated presence information for groups in respective communications. Hence, users 1, 4 and 8 can monitor communications for both the first and second groups.

Alternative and exemplary embodiments provide that the non-overlapping entities can be included in the first group or the second group, i.e., the first group can include users 7 and 8, and the second group can include user 2. The communication for the first group and the second group can be broadcast to the communication devices of users 1-5 and 6-10, respectively. However, the presence information for a non-overlapping entity provided in this manner may be older than the presence information for the overlapping entities.

Although in the present example only one group is included in the communication, one or more embodiments provide that more than one group can be included in a communication.

Accordingly, one or more embodiments provides for determining portions of the communication devices which have at least overlapping entries on entity lists corresponding to the communication devices. In this example, each of the users in the first group has an entity list that overlaps with entity lists of other users in the first group. Similarly, each of the users in the second group has an entity list that overlaps with entity lists of other users in the second group. As noted above, a few of the entity lists include a non-overlapping entry. The communication devices can be assigned responsive to the overlapping entries.

One or more embodiments provide that the pre-determined time for exchanging presence information corresponds to one or more of the groups. Accordingly, the presence information which is distributed to different groups can be spread out in time, if desired.

In accordance with conventional techniques, communication devices provide their entity lists to the communication network. Conventionally, the entity lists corresponding to various communication devices can be obtained from, for example, the VLR discussed above. The entity lists can be grouped as explained above.

Figure 5:
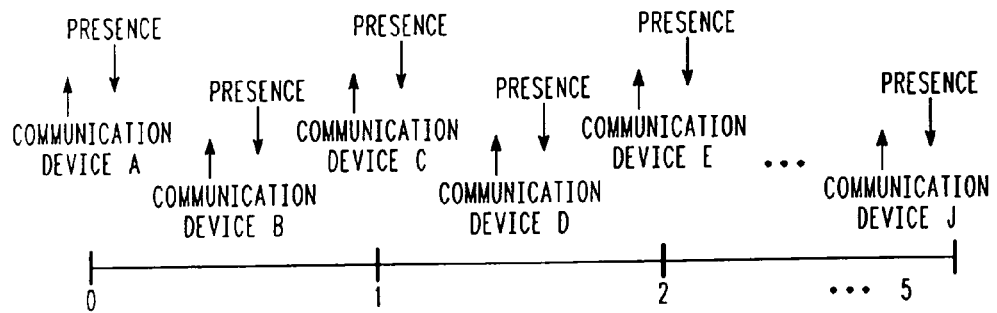
FIG. 5 is a timing diagram illustrating exemplary updating of presence information at individual communication devices.
Figure 6:
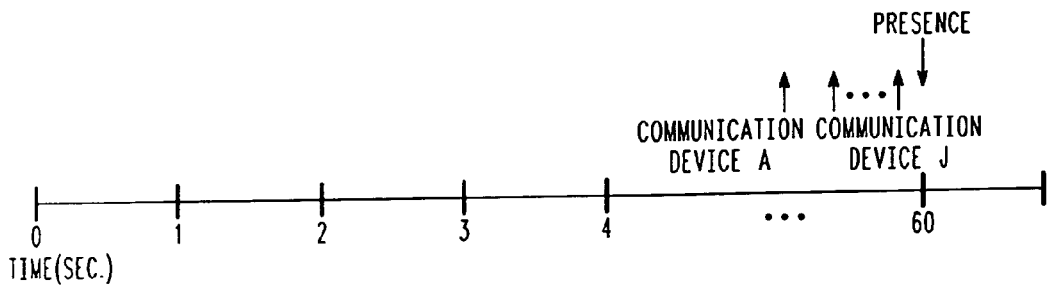
FIG. 6 is a timing diagram illustrating exemplary updating of presence information in accordance with one or more embodiments.

FIG. 5 and FIG. 6 are referred to in the following discussion, in order to illustrate various concepts relating to the timing of a submission of presence information from a communication device, and the timing of providing a communication with updated presence information.

Referring to FIG. 5, a timing diagram illustrating exemplary updating of presence information at individual communication devices will be discussed and described. The time interval set up for updating presence information in the depicted embodiment is five minutes. Here, each of communication devices A-J initiate contact with the communicate network and submit its current status. The status can be submitted either based on a pre-determined time interval, or after a change in status of the communication device. Further, presence information corresponding to an entity list is provided by the communication network to the communication device at a predetermined time interval. In the illustrated simplified example, users of communication devices A-J are all listed in each other's entity lists. Each communication device therefore should receive presence information for each other communication device. In this example, presence information is exchanged with a particular communication device over an interval of five minutes. (More frequent intervals may be costly.) As can be observed, presence information in this example can be as old as the interval, i.e., up to five minutes old. On the average, the age of the presence information is 2.5 minutes. The presence information that is provided to the communication devices is stale, and is less likely to be accurate at the time provided.

This example can illustrate exchanges of presence information over a conventional traffic channel or a conventional common channel. Where the exchange is provided over a traffic channel, the twenty messages in the example will have consumed about 20,000 bytes of space or transmit capacity, due to the average size of a traffic channel message. If the exchange occurs over a common channel, the messages in the example will have consumed about 4,000 bytes of space or transmit capacity, as calculated considering the average size of a common channel signal and paging areas. This can be contrasted to the example illustrated in FIG. 6.

Referring now to FIG. 6, a timing diagram illustrating exemplary updating of presence information in accordance with one or more embodiments will be discussed and described. For purposes of contrast to FIG. 5, the time interval for obtaining updated presence information is five minutes. The timing of the communication devices is coordinated so that, just prior to the pre-determined time, each of communication devices A-J initiates contact with the communicate network and submits its current status. This could be, for example, beginning one minute or less before the pre-determined time, or more advantageously thirty seconds or less before the pre-determined time, or even more advantageously twelve seconds or less before the pre-determined time. (It can be desirable to wrap up the submission of current status sufficiently before the pre-determined time so that the updated status information can reach and can be recognized by the presence server.)

The various entities can be distributed so as to initiate contact within the interval proximate before the pre-determined time, whereby a collision on the same channel can be avoided. Alternatively, the various entities can contact the network infrastructure device on different channels. The distribution can be random, although it can be advantageous to distribute the entities according to velocity of communication, for example, as determined by a rate of idle handoff, so that a fastest moving communication device provides information last. Velocity of communication can be measured, for example, by a rate of idle handoff, or in accordance with other metrics known to the communication device or the communication network. Accordingly, the interval proximate to the pre-determined time can be proportional to the velocity of communication.

A communication with presence information corresponding to entity lists can be provided by the communication network to the communication devices at the pre-determined time. As in the example of FIG. 5, users of communication devices A-J are all listed in each other's entity lists. In this example, presence information is exchanged with the communication devices at the pre-determined time. Presence information in this example can be as old as the interval proximate before the pre-determined time. Where the interval proximate is one minute, thirty seconds, or twelve seconds, the average age of the presence information is, respectively, 30 seconds, fifteen seconds, or six seconds. The presence information that is provided to the communication devices is fresh, and is likely to be accurate at the time provided.

In the illustrated embodiment, presence information is exchanged over a common signal channel. The eleven messages in this example will have consumed an estimated 120 bytes of space, considering the average amount of information provided by the communication device, and the information provided from the network infrastructure device in a bit map on the common signal channel. Considering an aggregate of the messages that are transferred, utilizing one or more embodiments can significantly reduce traffic on the communication network in comparison with conventional techniques. The average age of presence information can be reduced by more than half. Moreover, the presence update load on a communication network is 200 times less than a traffic channel solution, or 40 times less than a non-synchronized common channel solution, illustrated for example in FIG. 5, because messages specific to particular communication devices can be omitted.

Figure 7:
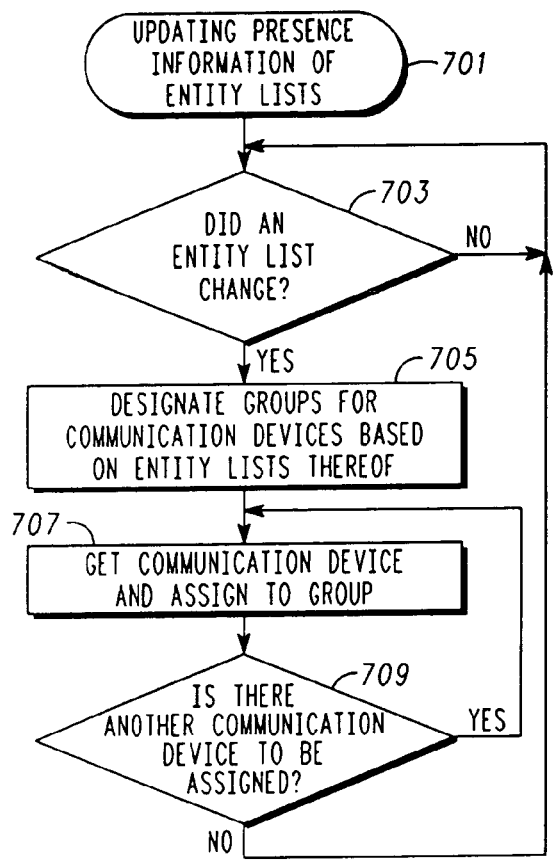
FIG. 7 is a flow chart illustrating an exemplary procedure for updating presence information of entity lists in accordance with various exemplary and alternative exemplary embodiments.
Figure 8:
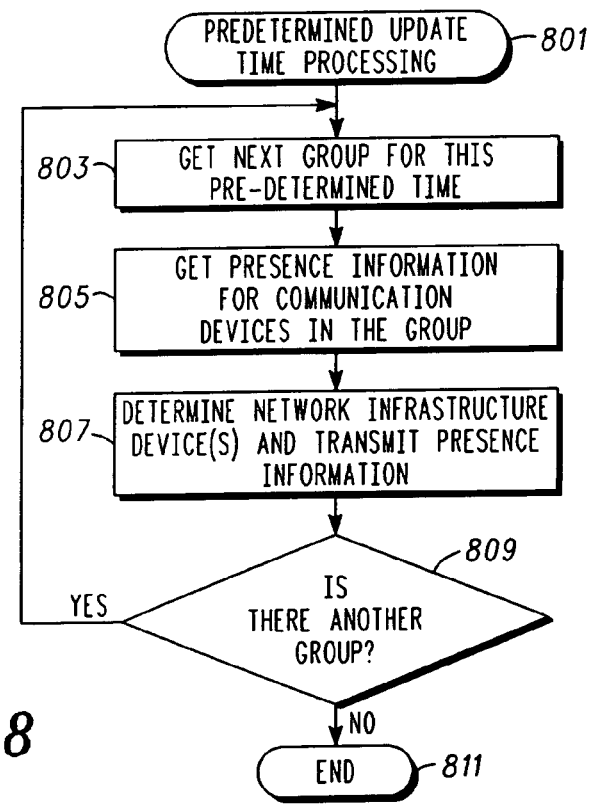
FIG. 8 is a flow chart illustrating an exemplary procedure for predetermined update time processing in accordance with various embodiments.
Figure 9:
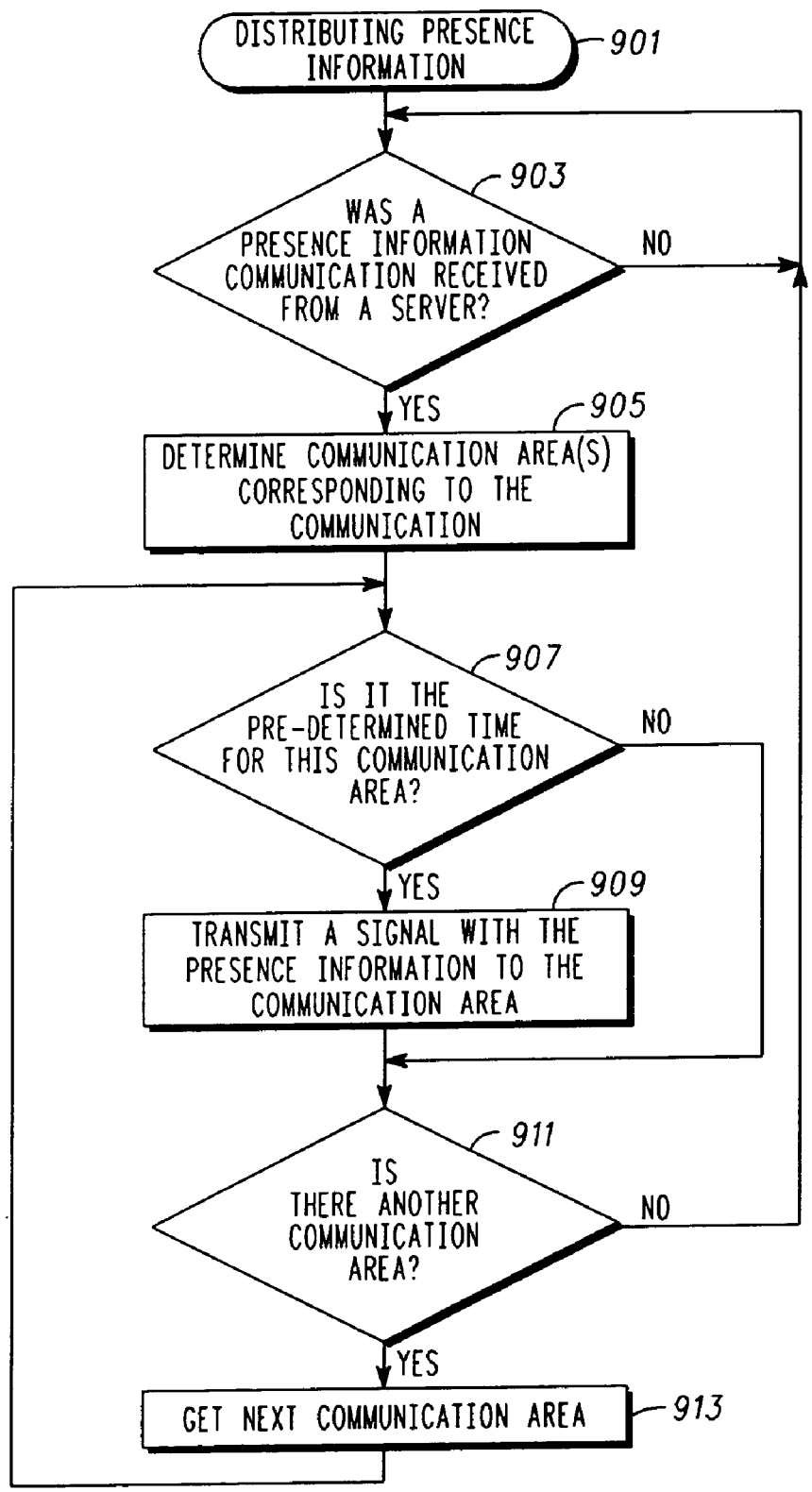
FIG. 9 is a flow chart illustrating an exemplary procedure for distributing presence information in accordance with one or more embodiments.
Figure 10:
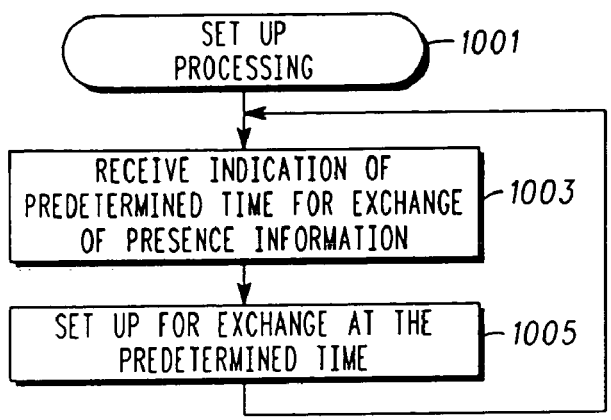
FIG. 10 is a flow chart illustrating an exemplary procedure for set-up processing in accordance with one or more embodiments.
Figure 11:
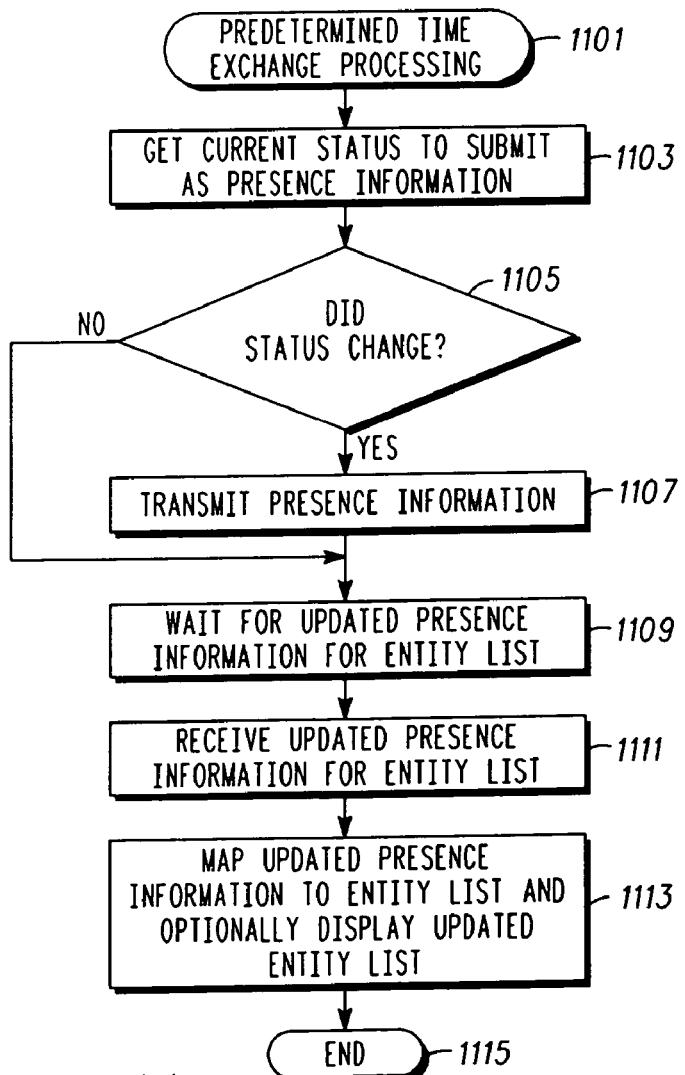
FIG. 11 is a flow chart illustrating an exemplary procedure for predetermined time exchange processing, in accordance with various embodiments.

FIGS. 7-11 are flow charts illustrating examples useful for providing various embodiments. FIGS. 7-8 provide an example of procedures that can be implemented on a presence server; FIG. 9 illustrates an example procedure that can be implemented on one or more network infrastructure devices; and FIGS. 10-11 provide an example of procedures that can be implemented on a communication device. One will appreciate that alternative embodiments are possible to implement the concepts detailed herein. Accordingly, the following are provided merely to provide exemplary illustrations of one or more embodiments.

FIG. 7 provides for updating groups when entity lists are changed, whereas FIG. 8 provides for obtaining and transmitting presence information at the appropriate time. Referring to FIG. 7, a flow chart illustrating an exemplary procedure for updating 701 presence information of entity lists in accordance with various exemplary and alternative exemplary embodiments will be discussed and described. The procedure can advantageously be implemented on, for example, a processor of a controller of the presence server, described in connection with FIG. 2 or other apparatus appropriately arranged. First, the procedure determines whether an entity list is changed 703. If not, the procedure loops until an entity list has changed. If an entity list has changed, then the procedure re-evaluates the groups; the procedure designates 705 groups for the communication devices based on the entity lists thereof. Determining groups has been discussed previously. When the groups are re-designated, the procedure particularly assigns communication devices to a particular group. Accordingly, the procedure gets 707 the next communication device and assigns it to an appropriate group. If there is another communication device to be assigned to a group 709, the procedure loops to handle assigning 707 the next communication device. Having re-assigned the communication devices, the procedure loops until an entity list has changed 703.

Referring now to FIG. 8, a flow chart illustrating an exemplary procedure for predetermined update time processing 801 in accordance with various embodiments will be discussed and described. The procedure complements the procedure of FIG. 8, and can advantageously be implemented on, for example, the processor of the controller of the presence server described in connection with FIG. 2 or other apparatus appropriately arranged. The procedure for pre-determined update time processing can be provided to wake up or be performed at each pre-determined time, e.g., via an interrupt or similar procedure. The procedure, when woken up, can be associated with a particular group or groups that are to be updated at a particular time. There may be more than one group and corresponding communications to be sent at a particular time. The procedure can get the next group 803 for the pre-determined time. Then, the procedure can retrieve 805 the presence information for the communication devices in the group, as explained in detail above. Also as explained above, the procedure can determine 807 the network infrastructure device(s) in the area where the communication devices are located, and can transmit the presence information for further distribution, e.g., to the network infrastructure device. The procedure can check 809 for another group, and can loop to process the next group 803. If there is no other group, the procedure can end 811 and be repeated as additional update times occur.

Referring to FIG. 9, a flow chart illustrating an exemplary procedure for distributing presence information 901 in accordance with one or more embodiments will be discussed and described. The procedure can advantageously be implemented on, for example, a processor of a controller in a network infrastructure device, described in connection with FIG. 3 or other apparatus appropriately arranged. The procedure provides for determining 903 if a presence information communication was received from a server, e.g., a presence server. If not, the procedure loops. If a presence information communication was received, the procedure determines 905 one or more communication area(s) corresponding to the communication 905. The process of determining communication areas has been previously described in detail. Then, according to alternative embodiments, the procedure determines whether 907 this is the pre-determined time for the communication area to receive the communication. (One or more embodiments can omit this logic and can assume that the communication message should be transmitted when received.) If it is the pre-determined time, the procedure can transmit 909 a signal with the presence information to the communication area, as previously detailed. Then, the procedure can check 911 whether there is another communication area corresponding to the communication, and consequently, whether another communication should be transmitted. If there is another communication area for the communication, then the procedure gets the next communication area 913 and loops back to determining whether 907 it is the proper time to send the communication for the communication area, as just described. The procedure continues to check 903 for the receipt of presence information communications received from the presence server.

FIGS. 10 and 11 illustrate complementary processes that can be provided to accommodate one or more embodiments, for setting up the pre-determined time and for exchanging presence information at the pre-determined time, respectively. The processes can advantageously be implemented on, for example, a processor of a controller for a communication device, described in connection with FIG. 4 or other apparatus appropriately arranged. Referring now to FIG. 10, a flow chart illustrating an exemplary procedure for set-up processing 1001 in accordance with one or more embodiments will be discussed and described. The process can be set up to exchange presence information at the pre-determined time. The process provides for receiving 1003 an indication of the predetermined time for exchanging presence information. Then, the process sets up 1005 for exchanging presence information at the predetermined time. This can include, for example, setting one or two timers to expire periodically at the pre-determined time, to initiate a process (such as illustrated in FIG. 11) for exchanging the presence information. This process also can handle other indications included with the indication of pre-determined time that was received, e.g., store information explaining the contents of communications with presence information, set up a proximate time prior to the pre-determined time, when the status of the communication device should be submitted to the communication network. The process can loop to continue to receive indications 1003 of the pre-determined time, which can be changed, e.g., when entity lists in the group corresponding to the communication device are modified.

Referring to FIG. 11, a flow chart illustrating an exemplary procedure for predetermined time exchange processing 1101, in accordance with various embodiments, will be discussed and described. In the present example, the process is initiated at the proper time proximate to the pre-determined time. The process provides for getting 1103 the current status of the communication device to be submitted as presence information to the communication network.

Optionally, the process checks 1105 whether the status changed, and omits transmitting presence information if the status is unchanged. This can be useful where, for example, any expiry associated with the presence information stored by the communication network is sufficiently long so that the communication network can avoid utilizing default presence information. Moreover, keeping in mind that the communication with presence information can be transmitted to areas where communication devices in a group are known to exist, this can be useful if other communication devices are in a local area or the vicinity.

The process then transmits 1107 the presence information to the communication network. As described previously, the transmission can be performed advantageously on a common signal channel. The process then can wait 1109 until the pre-determined time at which it can receive updated presence information from the communication network. The process can receive 1111 the updated presence information from the communicate network, corresponding to the entities in its entity list(s). The process can map 1113 or otherwise correlate the updated presence information to its entity list(s), and optionally display the updated entity list for the user and/or perform alerting to indicate that the entity list is updated. Having handled the updated presence information, the process ends 1115 but may be repeated as needed.

Where the communication device belongs to two or more groups, it may have two or more predetermined times at which to perform the foregoing processing.

It should be noted that the term communication unit may be used interchangeably herein with subscriber unit, wireless subscriber unit, wireless subscriber device or the like. Each of these terms denotes a device ordinarily associated with a user and typically a wireless mobile device that may be used with a public network, for example in accordance with a service agreement, or within a private network such as an enterprise network. Examples of such units include personal digital assistants, personal assignment pads, and personal computers equipped for wireless operation, a cellular handset or device, or equivalents thereof provided such units are arranged and constructed for operation in different networks.

The communication systems and communication units of particular interest are those providing or facilitating voice communications services or data or messaging services over cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof.

Furthermore the wireless communication units or devices of interest may have short range wireless communications capability normally referred to as WLAN (wireless local area network) capabilities, such as IEEE 802.11, Bluetooth, or Hiper-Lan and the like using, for example, CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of providing presence information, the method comprising:
    designating, for a plurality of communication devices, a plurality of groups, and assigning each of the communication devices to at least one of the groups;
    preparing a communication having presence information corresponding to a status of the plurality of communication devices in the at least one group;
    determining first network infrastructure device serving a first group of the at least one group and a second network infrastructure device serving a second group of the at least one group;
    transmitting, in accordance with the communication interface, at a first pre-determined time for the plurality of communication devices in the first group of the at least one group, the communication to the first network infrastructure device to be transmitted from the first network infrastructure device to the first group of the at least one group wherein the first pre-determined time is the same for the plurality of communication devices in the first group of the at least one group and transmitting, in accordance with the communication interface, at a second pre-determined time for the plurality of communication devices in the second group of the at least one group, the communication to the second network infrastructure device to be transmitted from the second network infrastructure device to the second group of the at least one group wherein the second pre-determined time is the same for the plurality of communication devices in the second group of the least one group and the first pre-determined time is different from the second pre-determined time and wherein the first pre-determined time is coordinated with the second predetermined time; and
    receiving, in accordance with the communication interface, at a third pre-determined time for the plurality of communication devices in the first group of the at least one group an update having presence information corresponding to the status of the plurality of communication devices in the first group of the at least one group.

2. The method of claim 1, wherein the preparing the communication further comprises including, in the communication, a unique identifier corresponding to the communication devices in the at least one group.

3. The method of claim 1, further comprising retrieving the presence information for the communication from a storage medium.

4. The method of claim 1, wherein the preparing the communication further comprises determining portions of the plurality of communication devices which have at least overlapping entries on entity lists corresponding to the communication devices, and wherein the assigning is responsive to the overlapping entries.

5. The method of claim 1, wherein the transmitting at the pre-determined time further comprises transmitting at a pre-determined time that corresponds to the at least one of the groups.

6. The method of claim 1, wherein the preparing the communication having presence information further comprises preparing a communication having presence information in the form of a bitmap.

* * * * *